UNITED STATES PATENT OFFICE.

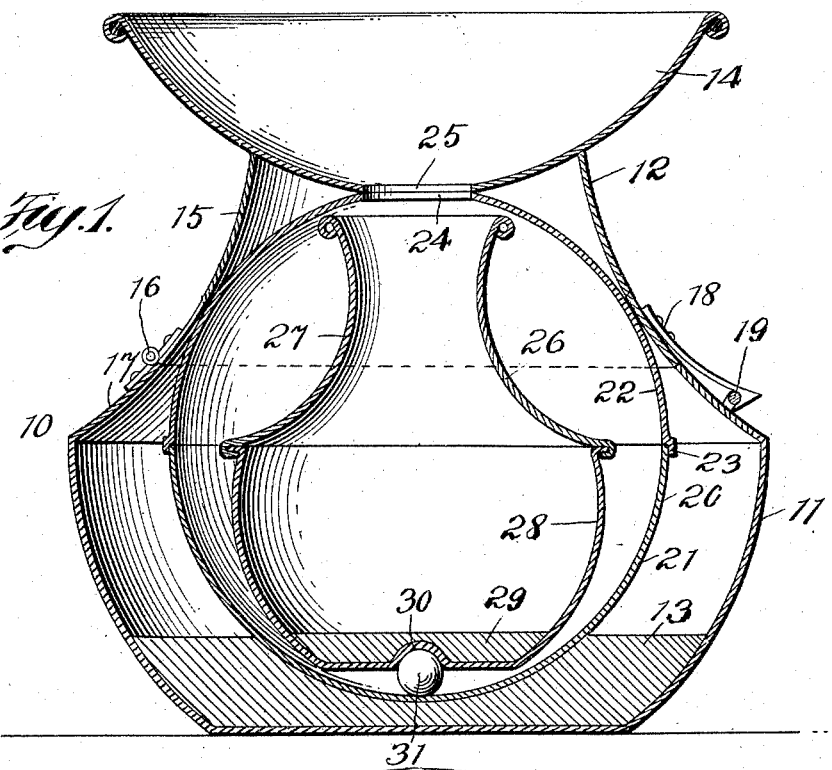
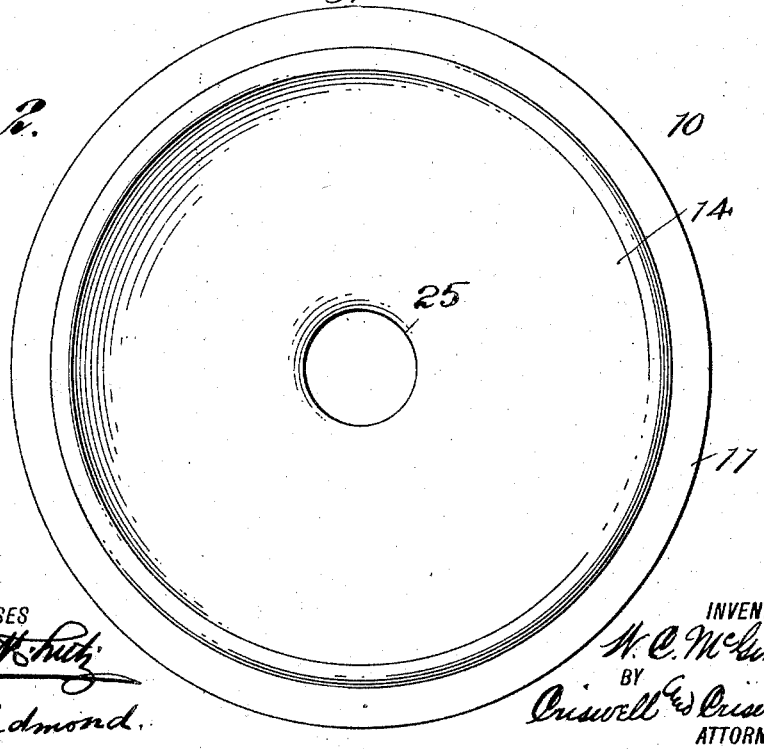

WILLIAM C. McGINNIS, OF BUTLER, PENNSYLVANIA.

SPITTOON.

967,225.

Specification of Letters Patent.  Patented Aug. 16, 1910.

Application filed April 30, 1908. Serial No. 430,128.

*To all whom it may concern:*

Be it known that I, WILLIAM C. McGINNIS, a citizen of the United States, and a resident of Butler, county of Butler, and State of Pennsylvania, have invented certain new and useful Improvements in Spittoons, of which the following is a full, clear, and exact description.

This invention relates more particularly to a spittoon which will be self-righting in case it is tipped over.

The primary object of the invention is to provide a simple and efficient device in which the receptacle which is adapted to receive refuse or whatever may be deposited therein is so inclosed and held within a casing that no matter what position the outer casing may assume the containing receptacle will automatically position itself upright so that the contents thereof cannot be spilled, thereby overcoming many of the objectionable features incident to devices of this class as ordinarily constructed.

A further object of the invention is to provide a simple and efficient device which may be readily made and which is accessible for cleaning or for other purposes and which may be made of various shapes and sizes.

With these and other objects in view, the invention will be hereinafter more particularly described with reference to the accompanying drawings, which form a part of this specification, and will then be pointed out in the claims at the end of the description.

In the drawings, Figure 1 is a vertical section of one form of device embodying my invention; and Fig. 2 is a plan view of the same.

The outer casing 10 consists of a base member 11 and a mouth member 12 which may be of any desired form. In the bottom of the base member is placed a weight 13 which will tend to normally hold the device in an upright position. The member 12 comprises the mouth or part 14 which is substantially semi-spherical in form and has projecting therefrom a flared part 15 which is hinged at 16 to the inner flared part 17 of the base member so that said member 12 may be swung upon the hinge 16 as a pivot to get at the interior of the casing 10. On the member 12 is a clasp or hook 18 of any suitable form which is adapted to engage a projection 19 or other means whereby the two members may be properly held together. Within the casing 10 is suitably held a substantially spherical body casing or member 20 preferably formed of two separable members 21, 22, the member 21 being fixed relative to base member 11. The body 20 has an opening 24 which is in alinement with the opening 25 of the member 12 so that any material deposited in the part 14 will pass through said opening, the member 14 being adapted to rest over the member or body 20 when in the position shown in Fig. 1.

To hold the material deposited in the part 14 so that the same cannot be spilled in case the device is tilted, I arrange within the body or inner casing 20 a movable receptacle 26 which is adapted to be guided within the inner spherical casing in such a way as to be always supported in an upright position. This receptacle 26 is slightly smaller than the interior of the spherical body or body member 20 and may be of any desired shape and has the mouth portion 27 and a base portion 28. In the base portion 28 is arranged a weight 29, and the bottom of said base portion is provided with a recess or depressed part 30 in which is adapted to fit a ball or other anti-friction device 31. This ball 31 normally supports the receptacle 26 so as to move readily within the inner casing 20 and as will be seen when the device is tilted in any direction the weight 29 will normally hold the mouth 27 in an upright position so that the contents in the receptacle cannot be spilled, the weight 13 of the outer casing also serving to right the body as a whole. By releasing the clasp 18 the member 12 may be thrown back on its hinge 16 so that the receptacle 26 is more accessible for cleaning or for other purposes.

While I have described the article as more particularly adapted as a spittoon, it may also be used for other purposes, and may be made so as to adapt it for use as an ink-well or for holding other liquids.

From the foregoing it will be seen that a simple and efficient device is provided in which a containing receptacle is movable relatively with respect to the outer casing so that it will always remain in a position to receive material placed therein, and will also right itself in case the device is tilted; that said device is simple in construction; and that the interior thereof is readily accessible for cleaning or for other purposes.

Having thus described my invention, I claim as new and desire to secure by Letters Patent:—

1. A device of the character described, comprising an outer casing provided with a weighted base, an inner spherical casing secured to said weighted base, a weighted receptacle located in said spherical casing, a ball interposed between said spherical casing and said receptacle, a portion of said receptacle being pressed inwardly to hold said ball in its proper position.

2. A device of the character described, comprising an outer casing, the base of said outer casing being weighted, a sectional spherical casing secured within said outer casing, and each provided with openings adapted to register, a receptacle provided with an opening located within said spherical member, the base of said receptacle being weighted and the opening to said receptacle being adapted to register with the openings in the spherical member and outer casing when the device is in its normal position.

This specification signed and witnessed this 27″ day of April A. D. 1908.

WILLIAM C. McGINNIS.

Witnesses:
L. P. WALKER,
J. S. JACK.